United States Patent
Stiesdal

(10) Patent No.: US 7,800,242 B2
(45) Date of Patent: Sep. 21, 2010

(54) WIND ENERGY INSTALLATION AND METHOD OF CONTROLLING THE OUTPUT POWER FROM A WIND ENERGY INSTALLATION

(75) Inventor: Henrik Stiesdal, Odense (DK)

(73) Assignee: Siemens Aktiengesellschaft, Munich (DE)

( * ) Notice: Subject to any disclaimer, the term of this patent is extended or adjusted under 35 U.S.C. 154(b) by 356 days.

(21) Appl. No.: 11/975,330

(22) Filed: Oct. 18, 2007

(65) Prior Publication Data

US 2008/0093856 A1    Apr. 24, 2008

(30) Foreign Application Priority Data

Oct. 19, 2006    (EP) .................... 06021973

(51) Int. Cl.
*F03D 9/00* (2006.01)
*H02P 9/04* (2006.01)
*F02D 29/06* (2006.01)

(52) U.S. Cl. .............. 290/44; 290/40 B; 290/40 D; 290/55

(58) Field of Classification Search ........ 290/40 B, 290/40 D, 44, 55; 416/1; 307/25–61, 129
See application file for complete search history.

(56) References Cited

U.S. PATENT DOCUMENTS

| | | | | | |
|---|---|---|---|---|---|
| 2,704,345 | A | * | 3/1955 | Jensen | 318/814 |
| 2,971,088 | A | * | 2/1961 | Nelson | 329/324 |
| 4,060,752 | A | * | 11/1977 | Walker | 315/244 |
| 4,346,332 | A | * | 8/1982 | Walden | 315/307 |
| 4,475,074 | A | * | 10/1984 | Reng | 318/800 |
| 4,613,807 | A | * | 9/1986 | Hosemann | 318/807 |
| 6,285,139 | B1 | * | 9/2001 | Ghanem | 315/291 |
| 6,400,102 | B1 | * | 6/2002 | Ghanem | 315/291 |
| 6,891,281 | B2 | * | 5/2005 | Wobben | 290/44 |
| 7,372,174 | B2 | * | 5/2008 | Jones et al. | 290/44 |
| 7,511,385 | B2 | * | 3/2009 | Jones et al. | 290/43 |
| 7,528,496 | B2 | * | 5/2009 | Fortmann | 290/44 |
| 7,638,893 | B2 | * | 12/2009 | Wobben | 290/55 |
| 2007/0108771 | A1 | * | 5/2007 | Jones et al. | 290/44 |
| 2007/0121354 | A1 | * | 5/2007 | Jones et al. | 363/47 |
| 2008/0093856 | A1 | * | 4/2008 | Stiesdal | 290/44 |
| 2008/0093857 | A1 | * | 4/2008 | Stiesdal | 290/44 |
| 2008/0258810 | A1 | * | 10/2008 | Elia | 330/53 |
| 2008/0272279 | A1 | * | 11/2008 | Thompson | 250/206 |

FOREIGN PATENT DOCUMENTS

| | | |
|---|---|---|
| EP | 1 282 774 B1 | 9/2003 |
| EP | 1 467 463 A1 | 10/2004 |

\* cited by examiner

*Primary Examiner*—T C Patel
*Assistant Examiner*—Pedro J Cuevas

(57) ABSTRACT

A method of controlling the output power from a wind energy installation to a utility grid having a specified nominal frequency is provided, in which the output power is controlled depending on the actual grid frequency in the utility grid such that the output power is reduced when the grid frequency exceeds a predetermined value. The predetermined value is at most two per mill higher than the nominal frequency of the grid and the output power is reduced as soon as any increase of the grid frequency above the predetermined value is detected.

13 Claims, 3 Drawing Sheets

WIND ENERGY INSTALLATION AND METHOD OF CONTROLLING THE OUTPUT POWER FROM A WIND ENERGY INSTALLATION

CROSS REFERENCE TO RELATED APPLICATIONS

This application claims the benefits of European application No. 06021973.0 filed Oct. 19, 2006, and is incorporated by reference herein in its entirety.

FIELD OF INVENTION

The present invention relates to a wind energy installation, i.e. a single wind turbine or a wind farm comprising a number of wind turbines. The invention further relates to a method of controlling the output power from such a wind energy installation to an electrical grid for which a nominal grid frequency is specified.

BACKGROUND OF THE INVENTION

Many wind energy installations are not stand alone installations provided for a single user but feed the generated electrical power into a grid which distributes the power to a large number of different users. As the power consuming devices of the users require electrical power within a certain parameter range, e.g., a specified nominal voltage and a specified nominal grid frequency, measures are necessary to ensure the stability of these grid parameters.

The grid parameters depend on a balance between the power fed into the grid by electrical power generating installations and the power consumed by the consumers. If the produced electrical power fed to the grid is less than the consumed power, the grid frequency drops. On the other hand, if the consumed power is less than the power fed into the grid, the grid frequency increases which could lead to malfunctions of the consumer's electrical devices.

As long as the fraction of electrical power generated by wind energy installations was relatively small compared to the fraction of electrical power generated by other power generating installations, it was not necessary for wind farms to react to variations in the grid frequency. However, as the fraction of electrical power fed into electrical grids by wind energy installations increases it becomes more and more important that these installations are capable of reacting to variations in the grid frequency.

EP 1 282 774 B1 describes controlling the output power of a wind energy generating plant such that it is constant as long as the grid frequency lies in the range between the nominal grid frequency and a threshold frequency which is at least 3 per mill higher than the nominal grid frequency. When the grid frequency increases above the threshold value the output power of the plant is continuously reduced.

EP 1 467 463 A1 describes a wind farm and a method of operating the same. The wind farm is driven at a fixed power output, e.g., maximum total power output, while the grid frequency stays within a predetermined frequency range. If, however, the grid frequency exceeds an upper boundary value of said frequency range, the power output of the wind farm is reduced. If, on the other hand, the grid frequency undershoots a lower boundary value of the predetermined frequency range, the power output is increased.

SUMMARY OF INVENTION

It is an objective of the present invention to provide a method of controlling the out-put power from a wind energy installation and a wind energy installation which allow an improved reaction to changes of the grid frequency.

This objective is solved by a method of controlling the output power from a wind energy installation and by a wind energy installation, e.g., a single wind turbine or a wind farm comprising a number of wind turbines, as claimed in the claims.

In the inventive method of controlling the output power from a wind energy installation, e.g. a single windmill or a wind farm comprising a number of windmills, to a utility grid having a specified nominal frequency the output power is controlled depending on the actual grid frequency in the utility grid such that the output power is reduced when the grid frequency exceeds a predetermined value. The predetermined value is at most 2 per mill higher than the nominal frequency and is preferably the nominal grid frequency itself. The output power is reduced as soon as any increase of the grid frequency above the predetermined value is detected.

The inventive method reduces the so-called "dead band", i.e. the frequency range above the nominal frequency in which the output power is kept constant. This allows for an earlier reaction to increasing output power than it is possible in the state of the art. Preferably, no dead zone at all is present so that the output power will be reduced as soon as the actual grid frequency deviates from the nominal grid frequency. In contrast thereto, the state of the art control mechanisms include dead bands which are as large as possible while maintaining the ability to react to large deviations of the grid frequency from the nominal frequency so that the amount of output power which is lost due to the controlling is reduced. In these state of the art methods, output power is only lost outside the dead band. Although the inventive method slightly increases the output power loss due to the reduced dead band and, in particular, due to not having a dead band at all, this loss is counter-weighted by the increased ability to quickly react to deviations of the actual grid frequency from the nominal grid frequency. In particular if the grid frequency increases rapidly such an early reaction can prevent the utility grid from becoming unstable.

The loss of output power due to the early reaction can be reduced by varying the rate of reducing the output power depending on the magnitude of the deviation of the actual grid frequency from the predetermined value, i.e. from the nominal grid frequency, if the predetermined value is the nominal grid frequency itself.

Moreover, a threshold value could be additionally present for the grid frequency. The threshold value would be higher than the predetermined value. Then, the reduction of output power could, e.g. be proportional to the deviation of the grid frequency from the nominal grid frequency. The constant of proportionality in the frequency range between the predetermined value and the threshold value could differ from the constant of proportionality in the frequency range above the threshold value. This offers the opportunity to only slightly reduce the output power as long as the frequency is in the range between the predetermined value and the threshold value. As a consequence, only a minor fraction of the output power is lost for controlling reasons in this frequency range, which is an acceptable trade-off for increasing the ability to react to frequency deviations. For example, if the predetermined value is the nominal grid frequency, the threshold value could be set as the threshold values for the dead bands in the state of the art, e.g. 3 per mill above the nominal grid frequency. Above the threshold value the reduction of output power could then be carried out as it is, e.g., described in EP 1 282 774 B1. However, as also in the range between the nominal grid frequency and the threshold value the output power has been reduced, the reduction for frequencies above the threshold value would start at an already lower level of output power than in the state of the art so that the reduction in the frequency range outside the threshold value could be less steep than in the state of the art. This reduces the requirements for the electronics by which the reduction of output power is controlled.

Alternatively, to the linear reduction with different constants of proportionality in at least two different frequency ranges, the inventive method can also be implemented with the reduction of output power being a non-linear function of the deviation of the grid frequency from the nominal frequency. In this case, no threshold value would be necessary. If the non-linear function was, e.g., a polynomial like a quadratic or cubic function, only a slight reduction of the output power would result as long as the deviation of the grid frequency from, e.g. the nominal grid frequency, is small. With increasing deviation the reduction of the output power per given frequency interval would also increase. In other words, the higher the deviation from the nominal frequency, the higher the reduction rate of output power. With higher order of the polynomial the reduction rate for the output power at low frequency deviations becomes less while the reduction rate at high frequency deviation increases.

Instead of giving a functional relationship between the reduction of output power and the deviation of the grid frequency the reduction of output power could also be defined by a transfer function.

An inventive wind energy installation is adapted to be connected to a utility grid for delivering output power to the utility grid. It comprises at least one wind driven generator, a generator electronics, a frequency sensor and a control unit. The frequency sensor is designed and arranged such as to be able to measure the grid frequency present in the utility grid and to output a frequency signal representing the grid frequency. The control unit is connected to the generator electronics for delivering a control signal and to the frequency sensor for receiving the frequency signal. It is adapted to calculate to the control signal depending on the grid frequency such that the output power is reduced as soon as any increase of the frequency above a predetermined value is detected. The predetermined value is at most 2 per mill higher than the nominal frequency of the grid and is preferably the nominal grid frequency itself.

The inventive wind energy installation is adapted for performing the inventive control method. The advantages described with respect to the inventive method therefore are also provided by the inventive wind energy installation.

In a further development of the inventive wind energy installation the control unit is adapted to calculate the control signal depending on the grid frequency such that the rate of reduction in the output power varies with the magnitude of the deviation of the grid frequency from the nominal frequency. This could, in a first alternative, be implemented by adapting the control unit to include at least one threshold value for the grid frequency which is higher than the predetermined value. The control unit would then be further adapted to reduce the output power proportionally to the deviation of the grid frequency from the nominal grid frequency. In addition, it would include two constants of proportionality with the constant of proportionality for reducing the output power in the frequency range between the predetermined value and the threshold value being different from the constant of proportionality for reducing the output power and the frequency range above the threshold value. In an alternative implementation, the control unit would be adapted to reduce the output power as a non-linear function of the deviation of the grid frequency from the nominal frequency. Such a non-linear function could either be given by a direct functional relationship between the reduction of output power and the deviation of the grid frequency, e.g. in form of a polynomial, or by a transfer function.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
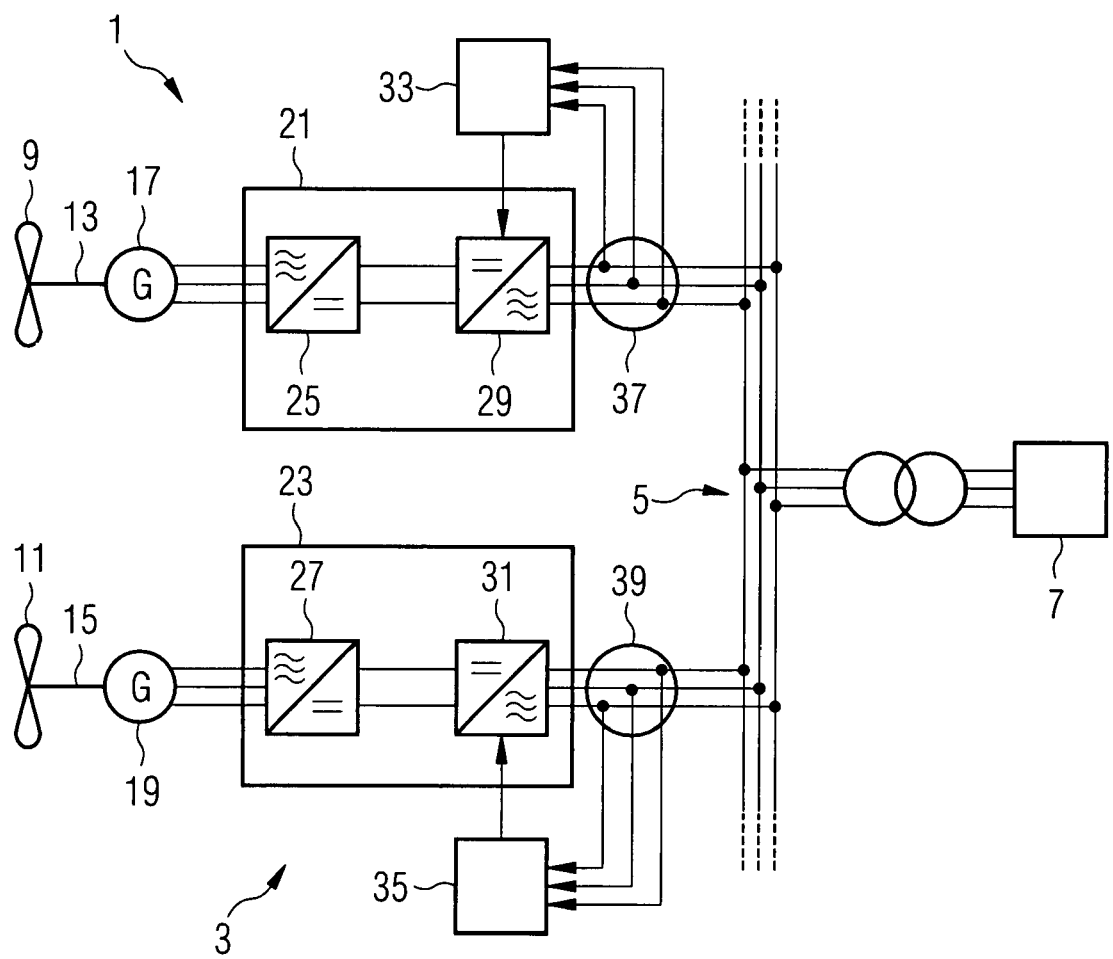
FIG. 1 schematically shows a first embodiment of an inventive wind energy installation.

The wind energy installation shown in FIG. 1 comprises a number of wind turbines two of which are exemplary shown in the figure. The wind turbines 1, 3 produce electrical output power and are connected via an internal node 5 to an external utility grid 7. Although the first embodiment comprises more than one wind turbine, it can also be implemented for a single wind turbine.

The wind turbines 1, 3 are variable speed wind turbines, i.e., the rotational speed of the rotor 9, 11 is allowed to vary depending on the wind conditions.

Each wind turbine 1, 3 comprises a rotor 9, 11 with a shaft 13, 15 transmitting the torque of the wind driven turning rotor 9, 11 to an AC generator 17, 19 which transforms the mechanical power provided by the rotation of the shaft 13, 15 into electrical power. Although not shown in the Figure, the shaft 13, 15 may be divided into a rotor shaft extending from the rotor to an optional gearbox and an output shaft extending from the gearbox to the generator 17, 19. With the gearbox, a transmission of the rotor shafts' rotation speed to a different rotation speed of the output shaft can take place with a certain transmission ratio.

The AC generator 17, 19 comprises a generator electronics and may either by a synchronous generator or an asynchronous generator. In a synchronous generator, a rotor rotates with the same rotational frequency as the rotating magnetic field produced by a stator of the generator, or with an integer relationship with the frequency of the rotating magnetic field, depending on the number of pole pairs present in the rotor. In contrast thereto, in an asynchronous generator the rotational frequency of the stator's magnetic field is more or less independent from the rotational frequency of the rotor. The difference in rotational frequency of the rotor and the stator is described by the slip of the asynchronous generator.

In the embodiment depicted in FIG. 1, synchronous generators are used in the wind turbines 1, 3 for producing the electrical power. The wind turbines 1, 3 are connected to the internal node 5 via frequency converters 21, 23 which are part of the generator electronics and which convert the frequency of the electrical power delivered by the generators 17, 19 into an electrical power having a fixed frequency which corresponds to the frequency of the grid 7. Each frequency converter 21, 23 comprises a rectifier 25, 27 which converts the amplifying current delivered by the generator 17, 19 into a direct current and an inverter which converts the direct current back into an amplifying current with the frequency of the grid 7.

Control units 33, 35 are present which are connected to a frequency sensor 37, 39 for receiving a frequency signal and to the inverter 29, 31 for delivering the control signal. The frequency sensor is present in the grid so as to allow the measurement of the actual grid frequency of the external grid 7. Although the frequency sensor 37, 39 is shown to be placed directly behind the output of the frequency converter 21, 23, it could also be placed behind the internal node 5 or even in the external grid 7. However, as the frequency at the internal node 5 matches the frequency in the external grid 7 the frequency measured by the frequency sensor 37, 39 at the output of the frequency converter 21, 23 is identical to the frequency in the external grid 7.

The control unit 33, 35 is adapted to produce a control signal depending on the measured grid frequency. The control signal represents the output power, in particular the active output power, to be output by the inverter 21, 23. In addition, the control signal can also be adapted to represent a special power factor which is a measure for the ratio of active power to the sum of active and reactive power.

In the present invention, the control unit 33, 35 is adapted to provide a control signal such that the output power P is reduced as soon as the grid frequency exceeds a given predetermined value. In a first embodiment, the predetermined value is defined by a deviation $\Delta f$ the measured grid frequency f from the nominal grid frequency $f_N$ by 2 per mill. In another embodiment the output power P is already reduced as soon as the grid frequency rises above the nominal grid frequency $f_N$.

Figure 2:
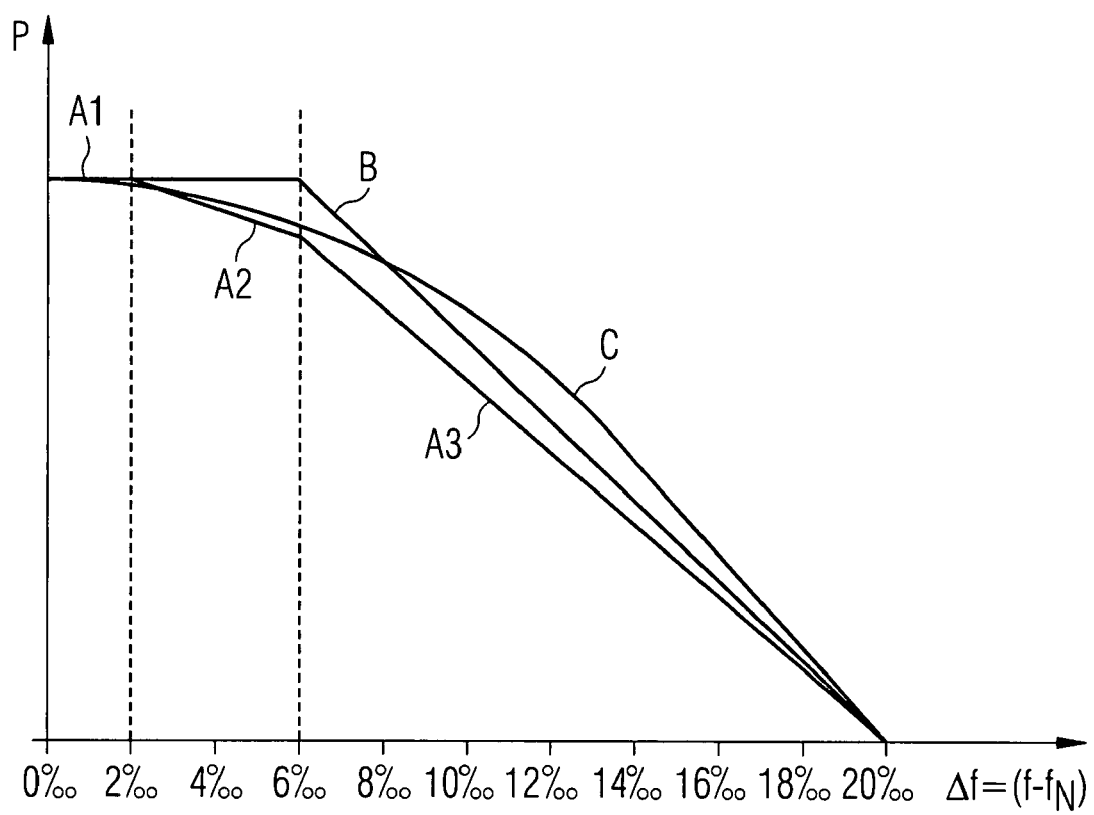
FIG. 2 shows the output power of the wind energy installation as a function of the grid frequency's deviation from the nominal grid frequency.

The dependency of the output power P from the deviation of the grid frequency $\Delta f$ for the first embodiment is represented in FIG. 2 by curve A. Curve B shows the dependency according to the state of the art. As can be seen from curve A, the output power P starts being reduced as soon as the deviation of the grid frequency f from the nominal grid frequency $f_N$ reaches 2 per mill. Before that value is reached, the output power P is kept constant (A1). When the frequency deviation $\Delta f$ rises above 2 per mill, which represents the predetermined value in the present embodiment, the output power P is reduced linearly with a first (negative) coefficient of proportionality (A2). As soon as a threshold value is reached, which is 6 per mill frequency deviation in the present embodiment, the coefficient of proportionality changes, i.e. it becomes more negative; so that the linear reduction of the output power becomes steeper above 6 per mill frequency deviation. The reduction can be such that the output power becomes zero as soon as the measured grid frequency f exceeds the nominal grid frequency $f_N$ by a given value, e.g. by 20 per mill, i.e. 2%.

FIG. 2 also shows, for comparison reasons, the reduction of output power according to the state of the art (B). In the state of the art, as in FIG. 1 of EP 1 282 774 B1, the output power is not reduced until a deviation of the measured grid frequency f from the nominal grid frequency $f_N$ of 6 per mill is reached. Then, after reaching 6 per mill, the output power P is linearly reduced until it is zero for a deviation of the measured grid frequency f from the nominal grid frequency $f_N$ of 20 per mill.

Although, according to the first embodiment, the reduction of the output power begins as soon as the frequency deviation $\Delta f$ reaches 2 per mill, i.e. the predetermined value is 2 per mill, the predetermined value could as well be less than a deviation of 2 per mill and, in particular, the nominal grid frequency $f_N$ itself. In this case, the linear reduction of output power A2 would already begin at $\Delta f=0$. Furthermore, the threshold value could be different to the 6 per mill value given in the first embodiment.

In a second embodiment of the invention the output power P is reduced according to a non-linear function of the grid frequency deviation $\Delta f$ In the present embodiment, this function is chosen such that the output power P becomes zero as soon as the frequency deviation $\Delta f$ reaches 20 per mill. The output power P is reduced as soon as the measured grid frequency f exceeds the nominal grid frequency and is, e.g. a negative quadratic or cubic function of the frequency deviation $\Delta f$. Note that although the output power is a negative quadratic or cubic function of the frequency deviation in the present embodiment, the output power could be any non-linear function reducing the output power with increasing frequency deviation $\Delta f$, in particular, any negative polynomial. Furthermore, a non-linear function could, e.g., be represented by a transfer function. Another possibility would be to combine linear and non-linear functions, e.g. defining a linear function for a first frequency range and a non-linear function for another frequency range.

Figure 3:
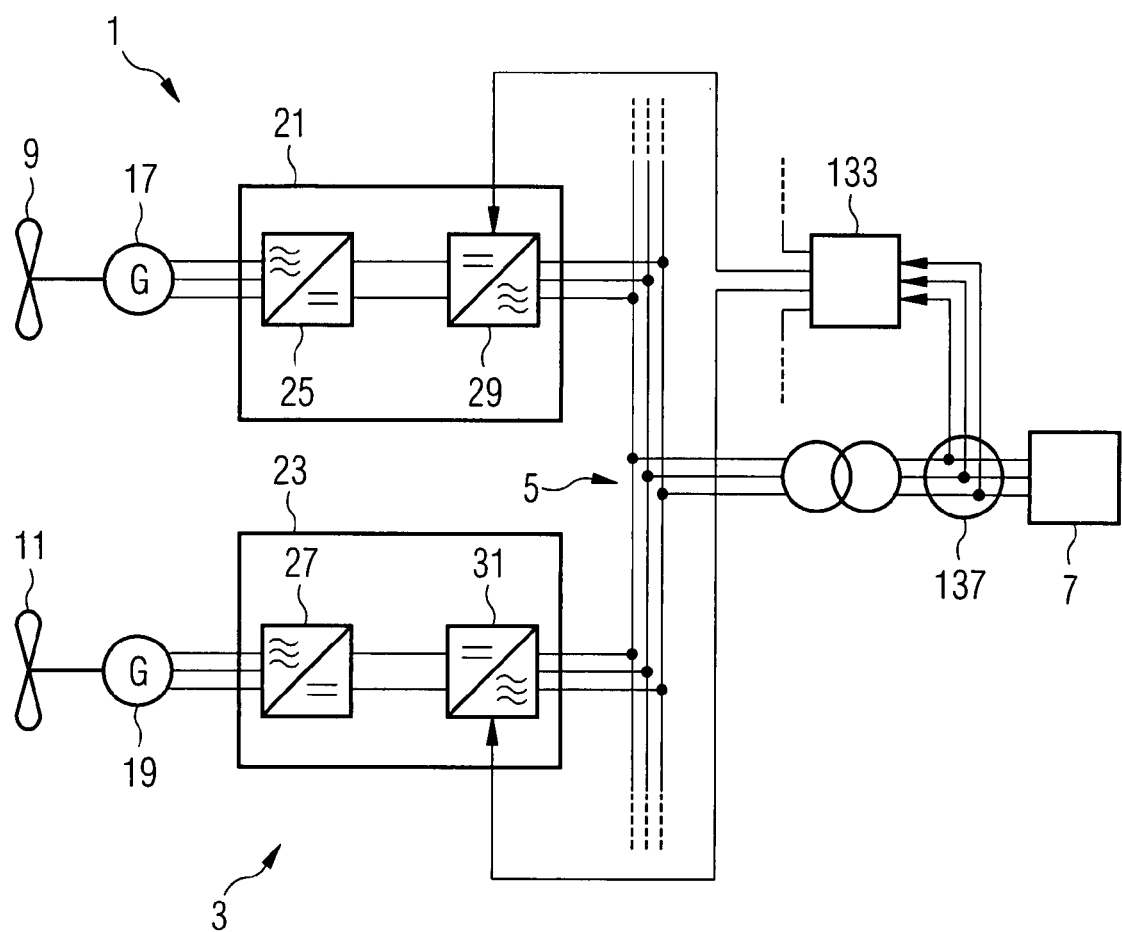
FIG. 3 shows a second embodiment of an inventive wind energy installation.

A second embodiment of the inventive wind energy installation is shown in FIG. 3.

Each wind turbine 1, 3 of the second embodiment corresponds substantially to the wind turbines described with respect to the first embodiment, shown in FIG. 1. The only substantial difference from the first embodiment is that not each single wind turbine 1, 3 is equipped with a control unit for controlling the output power as a function of the frequency deviation $\Delta f$ from the nominal grid frequency $f_N$ in the utility grid 7. Instead, a central control unit 133 is present at the wind farm which delivers individual control signals for each wind turbine 1, 3 of the wind farm on the basis of the measured frequency deviation $\Delta f$. Furthermore, the frequency sensor 137 is placed at the output node of the wind farm rather than at the inverter outputs.

The control method performed by the central controller 133 is the same as the control method performed by the controllers 33, 35 of the first embodiment and will not be described again. However, the centralised control unit 133 offers the possibility for differently reducing the output power of different wind turbines as a reaction of e.g. an increasing grid frequency. If, for example, the grid frequency increases and, as a consequence, the output power of the wind farm is reduced by the controller 133, it is possible to reduce output power of only some of the wind turbines and not reducing the output power of the other wind turbines. This could be useful if, e.g. some wind turbines operate at rated output power and other wind turbines operate at an output power which is lower than the rated output power. In this case, wear of the wind turbines which operate at rated output power is usually higher than the wear of wind turbines which are operated at a lower output power than rate output power. Therefore, in order to reduce the output power of the wind farm, it becomes possible with the second embodiment to only reduce the output power of those wind turbines which are operated at the rated output power. By this measure the wear of these wind turbines can be reduced.

The invention claimed is:
1. A method of controlling the output power from a wind energy installation to a utility grid having a specified nominal frequency, comprising:
    determining an actual grid frequency;

reducing the output power to the utility grid by a first linear function when the actual grid frequency is higher than a first value; and reducing the output power to the utility grid by a second linear function, different from said first linear function, when the actual grid frequency is higher than a second value of the grid, wherein the second value being greater than the first value, and wherein a rate of reducing the output power to the utility grid by the first linear function is a non zero value and a rate of reducing the output power to the utility grid by the second linear function is a non zero value.

2. The method as claimed in claim 1, wherein the first value is the nominal frequency of the grid so that the output power to the utility grid is reduced as soon as any increase of the grid frequency above the nominal frequency is detected.

3. The method as claimed in claim 1, wherein the rate of reducing the output power to the utility grid by the second linear function is greater than the rate of reducing the output power to the utility grid by the first linear function.

4. A wind energy installation connected to a utility grid for delivering output power to the utility grid comprising:
   a wind driven generator;
   a generator electronics;
   a frequency sensor constructed and arranged to measure the grid frequency present in the utility grid and to output a frequency signal representing the grid frequency; and
   a control unit connected to the generator electronics for delivering a control signal and to the frequency sensor for receiving the frequency signal, and which calculates the control signal depending on the grid frequency such that:
      the output power to the utility grid is reduced by a first linear function as soon as any increase of the grid frequency above a first value is detected, and
      the output power to the utility grid is reduced by a second linear function, different from said first linear function, as soon as any increase of the grid frequency above a second value is detected,
   wherein the first value being at most two per mill higher than the nominal frequency of the grid,
   wherein the second value being greater than the first value, and
   wherein a rate of reducing the output power to the utility grid by the first linear function is a non zero value and a rate of reducing the output power to the utility grid by the second linear function is a non zero value.

5. The wind energy installation as claimed in claim 4, wherein first value is nominal frequency of the grid and the control unit is adapted to calculate the control signal depending on the grid frequency such that the output power is reduced as soon as any increase of the grid frequency above the nominal grid frequency is detected.

6. The method as claimed in claim 1, wherein the first value is 2 per mill higher than the nominal frequency of the grid.

7. The method as claimed in claim 6, wherein the second value is 6 per mill higher than the nominal frequency of the grid.

8. The wind energy installation as claimed in claim 4, wherein the rate of reducing the output power to the utility grid by the second linear function is greater than the rate of reducing the output power to the utility grid by the first linear function.

9. The wind energy installation as claimed in claim 4, wherein the first value is 2 per mill higher than the nominal frequency of the grid.

10. The wind energy installation as claimed in claim 9, wherein the second value is 6 per mill higher than the nominal frequency of the grid.

11. A method of controlling the output power from a wind energy installation to a utility grid having a specified nominal frequency, comprising:
    determining an actual grid frequency;
    reducing the output power to the utility grid by a non linear function when the actual grid frequency is higher than a predetermined value.

12. The method as claimed in claim 11, wherein the predetermined value is the nominal frequency of the grid and the output power to the utility grid is reduced as soon as any increase of the grid frequency above the nominal frequency is detected.

13. The method as claimed in claim 11, wherein the rate of reducing the output power to the utility grid varies with the magnitude of a deviation of the grid frequency from the nominal frequency such that as the deviation increases the rate increases.

* * * * *